United States Patent Office 2,720,384
Patented Oct. 11, 1955

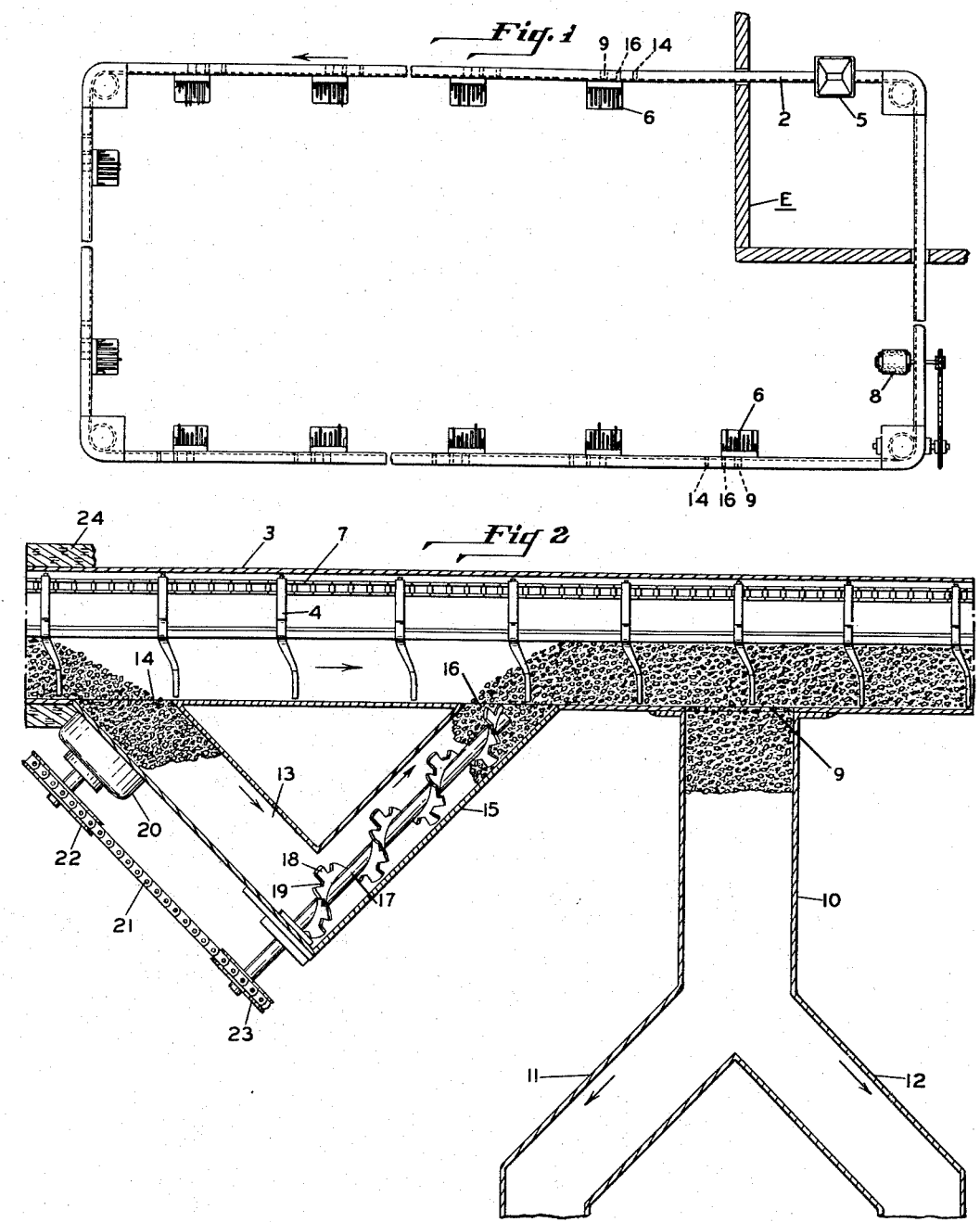

2,720,384

CONVEYOR SYSTEM

Luther E. Gaenzle, Lancaster, Pa., assignor to Armstrong Cork Company, Lancaster, Pa., a corporation of Pennsylvania Application June 10, 1953, Serial No. 360,758

4 Claims. (Cl. 259—7)

This invention relates to a conveyor system. It is particularly useful in cork composition manufacture and especially in cork composition extrusion. In the extrusion of cork composition into rods for subsequent slicing into disks for lining metal crown closure shells, for instance, the cork granules which may be a mixture of 6 to 20 mesh U. S. Standard Screen size are coated with a mixture of glue and glycerine and with a small amount of paraformaldehyde necessary to tan the glue and render it resistant to moisture attack. The cork granules are fed to a hopper and are delivered by gravity into the open throats of a plurality of extrusion tubes into which reciprocating plungers are moved to compact the cork granules and move them through the extrusion tubes where the binder-coated granules are heated to set the binder and extrude the bound granules as cylindrical rods. In order to maintain the binder-coated granules in a free-flowing condition as delivered to the feed hopper, it is customary to reduce the temperature of the mix and hold it at such reduced temperature until it reaches the extrusion tube where heat is applied. When a mass of such free-flowing granules is vibrated while disposed on a horizontal supporting surface as in horizontal conveyor systems used to feed a battery of extrusion machines, the finer particles gravitate toward the supporting surface, and the large particles remain thereabove. Such particle segregation is objectionable because it results in the production of finished products which vary in density and other physical characteristics.

This segregation problem is particularly acute in a multiple unit extrusion operation where a battery of extrusion machines are fed from a common charging source through a horizontal over-head conveyor. In this system, the particles tend to segregate objectionably in the horizontal runs of the conveyor and result in some of the extrusion units being charged with mix rich in fine particles while other units are charged with mix rich in coarse particles.

The principle object of the present invention is to provide a conveying system for particulate materials which will deliver the mix to an operating station or stations free of objectionable particle segregation.

A further object of the invention is to provide a system which will be effective to intersperse the particulate material immediately prior to its discharge at an operating station.

Other objects of the invention will become apparent from consideration of the following detailed description of an embodiment of the invention.

In the accompanying drawing:

Figure 1 is a diagrammatic view illustrating the invention in a run-around conveyor for charging a plurality of cork composition extrusion machines; and Figure 2 is a cross-sectional view to an enlarged scale and partially broken away illustrating the particle interspersing arrangement at one operating station in a battery of extrusion machines.

The system comprises a generally horizontal distribution conveyor 2. This may be in the form of a sheet metal housing 3 of cylindrical or rectangular cross-sectional shape. Means such as the conveyor blades or flights 4 of Figure 2 are provided for conveying the particulate material along the path defined by the conveyor 2. As shown in Figure 1, the conveyor 2 is directed in a closed path and leads from a supply hopper 5 disposed in an enclosure E into an adjacent area where a plurality of extrusion machines 6 are positioned to be charged with particulate material by the conveying system. The conveyor leads from the machines back to the supply hopper. The blades 4 are preferably mounted on an endless chain 7, and the chain is driven by a suitable power source such as geared head motor 8.

At each operating station, such as the extrusion stations 6 of Figure 1, a discharge opening 9 (Figure 2) is provided in the distribution conveyor 2 and downspouts 10, with branches 11 and 12 leading therefrom to each of the extrusion machines.

The foregoing is a typical distribution system of conventional design and when used for the delivery of cork granules of mixed sizes results in undesirable particle segregation, with the result that the mixture delivered to the various extrusion machines varies to an objectionable degree, some being fed a mixture rich in the fine-sized granules and others a mixture rich in the coarse-sized granules rather than the desired uniform proportioning of particles of the various sizes.

This objectionable particle segregation is overcome in accordance with the present invention by the provision of a redistribution chamber including a discharge chute 13 which leads from an opening 14 in the bottom of conveyor 2. This chute preferably is proportioned so as to receive substantially all of the particulate material being conveyed along the conveyor 2 and is inclined with respect to the horizontal run of the conveyor 2 so that the particulate material will discharge thereinto by gravity. Associated with the chute 13 and forming part of the redistribution chamber is a delivery line 15 which leads back to the conveyor 2. The chute 13 and delivery line 15 are preferably in the form of cylindrical sheet metal tubes, joined together at their lines of intersection, and are preferably completely closed except for the inlet opening 14 into which chute 13 previously mentioned and a corresponding outlet opening 16 leading into the conveyor 2 at a point adjacent to discharge opening 9, as shown in Figure 2.

Interspersion of the particles, such as the cork granules previously mentioned, is effected in the embodiment illustrated by a combined conveyor and mixer which is in the nature of a screw conveyor with a mixing flight. It includes a shaft 17 upon which is helically mounted flight 18 having notches 19 provided therein to permit flow of the particulate material around the flight and insure proper interspersion of the material. The conveyor flight is driven by a motor 20 through a belt 21 which is trained over pulleys 22 and 23. The speed of rotation of the flight is such that proper interspersion is effected and also such that the particulate material is returned to the conveyor 2 through outlet opening 16 at a rate equivalent to the rate of delivery through inlet opening 14, thus insuring that all material being conveyed along the conveyor 2 will pass into the chute 13 and no substantial volume will by-pass the interspersing unit. With some materials a conventional screw conveyor will provide adequate interspersion. Air interspersion may be effected with other materials. Many different types of interspersing units may be used. While it is preferred to have the interspersing unit receive all of the mix being moved along conveyor 2, this may not be essential for some mixes. Adequate interspersion may be effected in such instances by forcibly injecting into the stream of particles moving along the conveyor 2 that portion of the mix which is delivered into chute 13, such forcible injection being effected by screw conveyor 17—18. This will effect interspersion of the mix moving along conveyor 2 and the mix being injected from below through delivery line 15 into the moving stream of granules in the main conveyor 2.

Preferred practice is to provide an interspersing unit at each operating station as diagrammatically illustrated in Figure 1. This insures that all of the particulate material will be fully interspersed immediately prior to delivery to the operating machine through discharge outlet 9, and any segregation of particles which may have occurred in movement of the material along conveyor 2 will have been eliminated in the interspersing unit. Where a minor amount of segregation can be tolerated, the interspersing units may be spaced along the conveyor where necessary to overcome objectionable particle segregation. Some mixes, of course, are more susceptible to particle segregation than others and such factor should be taken into account in laying out and utilizing a system embodying the present invention.

In conveying cork granules coated with a glue binder to a battery of extrusion machines, room E will be refrigerated to maintain the temperature of the binder-coated granules low enough to avoid any substantial coherence of the granules so that the same will be essentially free flowing. To insure that the granules will be delivered to the extrusion machines in substantially the same cooled condition—this is essential to proper extrusion machine operation—the housing 3 is preferably insulated with corkboard or other heat-insulation material 24, a small section of which has been illustrated in Figure 2. The entire conveyor system including the chutes 13 and delivery lines 15 will be insulated and completely closed, except for the opening in the charging hopper 5.

As a typical example of the operation of the system of this invention, it will be assumed that the hopper 5 will be charged with cork granules of mixed sizes ranging from 6 to 20 mesh U. S. Standard screen size. With this size of cork granules, substantially all will pass through a 6-mesh screen and substantially all will be retained on a 20-mesh screen and the remaining larger and smaller particles will be discarded for other uses or regrinding. This is a well-recognized screening practice employed in cork composition manufacture.

It will be assumed that each extrusion machine will consume 100 pounds of the binder-coated granules or mix per hour. To insure that each of the eleven extrusion machines of Figure 1 are always fully charged, the conveyor 2 will be arranged to deliver the mix at a rate of 1200 pounds per hour, including excess mix returned by the conveyor. At each operating station, essentially all of the mix will pass into an interspersing unit and will be redelivered to the conveyor immediately in advance of discharge opening 9 and downspouts 10 where approximately one-twelfth of the mix will be discharged at each station, maintaining the downspouts 10 filled at all times. At the start of a run, of course, all of the mix will fall into the downspout 10 of the first machine in the line until it is filled and then into the second downspout, and so on until all are filled. The mix in excess of that required to keep all of the machines fully charged is conveyed back to the station of hopper 5 and constitutes part of the mix which is delivered together with added mix from hopper 5 as movement of conveyor 2 continues.

With the system of this invention, segregation which occurs in the delivery of particulate materials along a conveyor is overcome by interspersion of substantially all of the granules prior to discharge of a portion of them into an operating station, and an essentially uniform interspersion of the particles of the mix is thus obtained in the finished product fabricated at the operating station, such as the extruded rods of the embodiment chosen for illustration.

I claim:

1. In a conveyor system for delivering particulate materials subject to segregation: a generally horizontal distribution conduit having an inlet opening and at least one discharge opening therein; means for conveying particulate material along said distribution conduit; and means associated with said distribution conduit and disposed adjacent to said discharge opening for overcoming segregation of said particulate material which occurs in said distribution conduit comprising a redistribution chamber including a downwardly directed portion leading from an opening in the bottom of said distribution conduit and into which a substantial portion at least of the particulate material being conveyed along said distribution conduit will pass and an upwardly directed portion connected to said downwardly directed portion and leading back to an opening in the bottom of said distribution conduit at a point in advance of and adjacent to said discharge opening, and means disposed within said redistribution chamber for interspersing said particulate material and conveying it through said upwardly directed portion and back into said distribution conduit.

2. In a run-around conveyor system for particulate materials subject to segregation which includes a horizontal distribution conduit and an endless conveyor with flights thereon for conveying material along said conduit for discharge through openings in said conduit at a plurality of operating stations, the combination of: means disposed at a plurality of said operating stations for redistributing the particulate material which has become segregated during travel and each comprising a redistribution chamber including a downwardly directed portion leading from an opening in the bottom of said distribution conduit and into which a substantial portion at least of the particulate material being conveyed along said conduit will pass and an upwardly directed portion leading back to an opening in the bottom of said distribution conduit at a point in advance of and adjacent to one of said discharge openings, and means disposed within said redistribution chamber for interspersing said particulate material and conveying it through said upwardly directed portion and back into said distribution conduit as a redistributed mix for delivery by said flights to an adjacent discharge opening at one of said operating stations.

3. In a conveyor system for delivering particulate materials subject to segregation: a generally horizontal distribution conduit; means for conveying particulate material along said distribution conduit, said conduit having a plurality of spaced discharge openings therein; and means for overcoming segregation of said particulate material in said distribution conduit prior to discharge through said discharge openings comprising a plurality of chutes spaced along said conduit and leading therefrom and into which a substantial portion at least of the particulate material being conveyed along said conduit will pass, delivery lines connecting said chutes to said conduit at points in advance of and closely adjacent to said discharge openings in said conduit, and interspersing means in said delivery lines for interspersing said particulate material delivered to said conduit for discharge through an adjacent discharge opening therein.

4. In a conveyor system for delivering particulate materials subject to segregation: a generally horizontal distribution conduit having an inlet opening and a plurality of discharge openings therein; means for conveying particulate material along said distribution conduit in a closed path from said inlet opening over said discharge openings and back to said inlet opening; and means for overcoming segregation of said particulate material which occurs in said distribution conduit comprising a plurality of downwardly directed chutes leading from said conduit and into which substantially all of said particulate material will pass, delivery lines connected to said chutes and leading to said conduit adjacent to said discharge openings, and a screw conveyor in each of said delivery lines for interspersing said particulate material and conveying it along said delivery line back into said conduit for discharge of a portion thereof through said adjacent discharge opening.

References Cited in the file of this patent

UNITED STATES PATENTS

| | | |
|---|---|---|
| 379,498 | Van Gelder | Mar. 13, 1888 |
| 453,130 | Ritcher | May 26, 1891 |
| 474,592 | Edison | May 10, 1892 |
| 2,074,988 | O'Brien et al. | Mar. 23, 1937 |
| 2,147,199 | Hapman | Feb. 14, 1939 |
| 2,155,874 | Sinden | Apr. 25, 1939 |